US008199968B2

(12) United States Patent
Schulmeister

(10) Patent No.: US 8,199,968 B2

(45) Date of Patent: Jun. 12, 2012

(54) METHOD FOR PRINTING A PRINTING SUBSTRATE

(75) Inventor: Peter Schulmeister, Pfaffenhofen (DE)

(73) Assignee: manroland AG, Offenbach/Main (DE)

( * ) Notice: Subject to any disclaimer, the term of this patent is extended or adjusted under 35 U.S.C. 154(b) by 937 days.

(21) Appl. No.: 12/233,562

(22) Filed: Sep. 18, 2008

(65) Prior Publication Data

US 2009/0074237 A1 Mar. 19, 2009

(30) Foreign Application Priority Data

Sep. 19, 2007 (DE) ......................... 10 2007 044 623

(51) Int. Cl.
*G06K 9/00* (2006.01)

(52) U.S. Cl. ...... 382/100; 358/1.18; 358/1.15; 359/455; 359/619; 707/E17.008

(58) Field of Classification Search .................. 382/100, 382/112; 358/1.18, 1.15; 359/455, 619; 707/E17.008
See application file for complete search history.

(56) References Cited

U.S. PATENT DOCUMENTS 6,251,566 B1 * 6/2001 Brosh et al. .................. 430/321
6,738,155 B1 * 5/2004 Rosenlund et al. .......... 358/1.15
2008/0000367 A1 * 1/2008 Jooste et al. .................. 101/211

FOREIGN PATENT DOCUMENTS

| | | | |
|---|---|---|---|
| DE | 39 24 989 | A1 | 2/1991 |
| DE | 44 27 978 | A1 | 2/1996 |
| DE | 10 2005 019 533 | A1 | 11/2006 |
| DE | 10 2005 037 497 | A1 | 2/2007 |
| DE | 10 2005 060 441 | A1 | 6/2007 |
| EP | 1 380 982 | A1 | 1/2004 |
| EP | 1 454 746 | A1 | 9/2004 |
| WO | WO 2007/107234 | A1 | 9/2007 |

* cited by examiner

*Primary Examiner* — Atiba O Fitzpatrick
(74) *Attorney, Agent, or Firm* — Crowell & Moring LLP

(57) ABSTRACT

A method for printing a printing substrate is disclosed. The printing substrate is printed by a printing-plate-based printing method, in particular by an offset printing method, with a printed image that is the same for printed copies of a print job and therefore with a static printed image as well as, in addition to the printing-plate-based printing method, by a non-printing-plate-based printing method, in particular an inkjet printing method, with a printed image that is variable for the printed copies of the print job and therefore with a dynamic printed image. After the static and dynamic printing of the printing substrate, each printed copy is detected using measuring techniques and recorded at least in sections in such a manner that each printed copy is verifiable with respect to its authenticity.

10 Claims, 1 Drawing Sheet

METHOD FOR PRINTING A PRINTING SUBSTRATE

This application claims the priority of German Patent Document No. 10 2007 044 623.5, filed Sep. 19, 2007, the disclosure of which is expressly incorporated by reference herein.

BACKGROUND AND SUMMARY OF THE INVENTION

The invention relates to a method for printing a printing substrate.

In printing-plate-based printing presses, preferably those operating in accordance with the offset printing principle, such as, for example, web-fed rotary printing presses as well as sheet-fed printing presses, non-printing-plate-based printing devices, such as, for example, inkjet printing devices, are being used to individualize printing products produced with offset printing with, for example, barcodes, numbering or other markings. Printing-plate-based printing methods are used for printing a printing substrate with a printed image that is the same for all printed copies of a print job and thus with a static printed image. In the case of non-printing-plate-based printing methods, it is possible to print a printing substrate printed with a static printed image, and, in addition to the printing-plate-based and therefore static printing, with a printed image that is variable for printed copies of the print job and therefore dynamic printed image.

In cases when a printing substrate printed with a static printed image by means of a printing-plate-based printing method, e.g., for games of chance or lotteries, is supposed to be completed in the above manner with a dynamic printed image, in particular with a bi-unique lottery number, by means of a non-printing-plate-based printing method, it is important for each printed copy that is produced to represent a forgery-proof unique copy, particularly in cases when there is increasing interest for potential forgers to forge printed copies because of the commercial value of the game of chance or the lottery.

Until now, no methods have been known which could guarantee that a printing substrate printed with a printed image by means of a printing-plate-based printing method could be printed, in addition to the printing-plate-based printing method, in a forgery-proof manner with a dynamic printed image by means of a non-printing-plate-based printing method.

Starting herefrom, the present invention is based on the objective of creating a novel method for printing a printing substrate. According to the invention, after the static and dynamic printing of the printing substrate, each printed copy is detected using measuring techniques and recorded at least in sections in such a manner that each printed copy is verifiable with respect to its authenticity.

The inventive method provides that, after the static and dynamic printing of the printing substrate, each printed copy be detected using measuring techniques and recorded at least in sections in such a manner that especially the dynamic printed image of each printed copy is verifiable with respect to its authenticity. By comparing a printed copy with measuring data recorded in a database, it will always be possible to examine without a doubt whether a printed copy is authentic or was forged.

Preferred embodiments of the invention are disclosed in the following description. Exemplary embodiments of the invention are explained in greater detail on the basis of the drawings.

DETAILED DESCRIPTION OF THE DRAWINGS

The present invention relates to a method for printing a printing substrate, wherein the printing substrate is printed with a printing-plate-based printing method, as well as, additionally, preferably in-line with the printing-plate-based printing method with a non-printing-plate-based printing method. The printing-plate-based printing method is preferably an offset printing method and the non-printing-plate-based printing method is preferably an inkjet printing method. The inventive method is used in web-fed rotary printing presses in particular.

In the case of the printing-plate-based printing method, a printing substrate is printed with a printed image that is the same for all printed copies of a print job and therefore with a static printed image. Preferably in-line with the printing-plate-based printing method, the to-be-printed printing substrate is printed by means of the non-printing-plate-based printing method with a printed image that is variable for all printed copies of a print job and therefore with a dynamic printed image. In this case, this is a unique identification code such as, for example, a lottery number, for games of chance or lotteries. Consequently, each printed copy is a unique copy that must be forgery-proof.

The inventive method provides that, after the static and dynamic printing of the printing substrate, each printed copy be detected using measuring techniques and recorded at least in sections in such a manner that each printed copy is verifiable with respect to its authenticity. The detecting of the printing substrate using measuring techniques preferably takes place in-line with the printing-plate-based, or static, and non-printing-plate-based, or dynamic, printing of the printing substrate. The recording of the printing substrate using measuring techniques may also take place offline from the static and dynamic printing.

Each printed copy is preferably detected using measuring techniques at least in sections in the area of the dynamic printed image. Furthermore, it is possible in the vicinity of the dynamic printed image to detect patterns and/or artifacts generated when printing the printing image, and/or in the vicinity of the dynamic printed image to detect patterns and/or artifacts generated when printing the static printing image, and/or in the vicinity of the dynamic printed image to detect properties of the printing substrate as such in order to make the authenticity of each printed copy verifiable on the basis of the corresponding measured data.

A sensor, which generates a digital measured image of the section of the printing substrate detected using measuring techniques and stores it in a database, is preferably used to detect each printed copy using measuring techniques. A camera is preferably used in this case, whose resolution and exposure time are adapted to the printing speed of the static and dynamic printing of the printing substrate.

Figure 1:
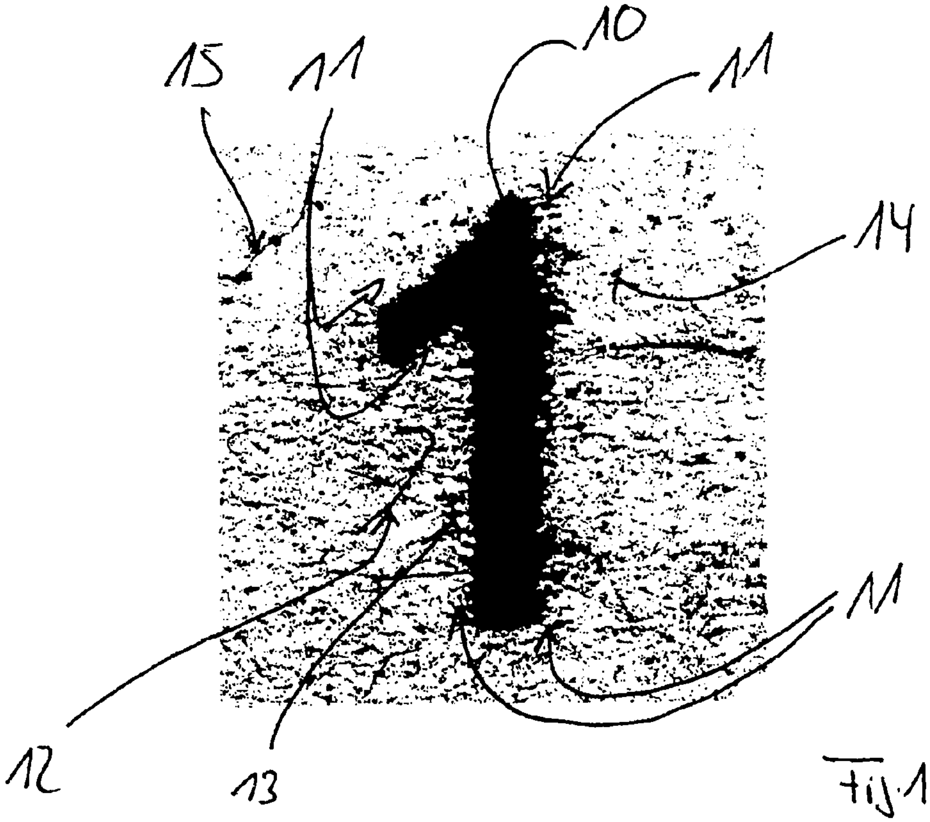
FIG. 1 is a first schematic representation to illustrate the inventive method for printing a printing substrate.
Figure 2:
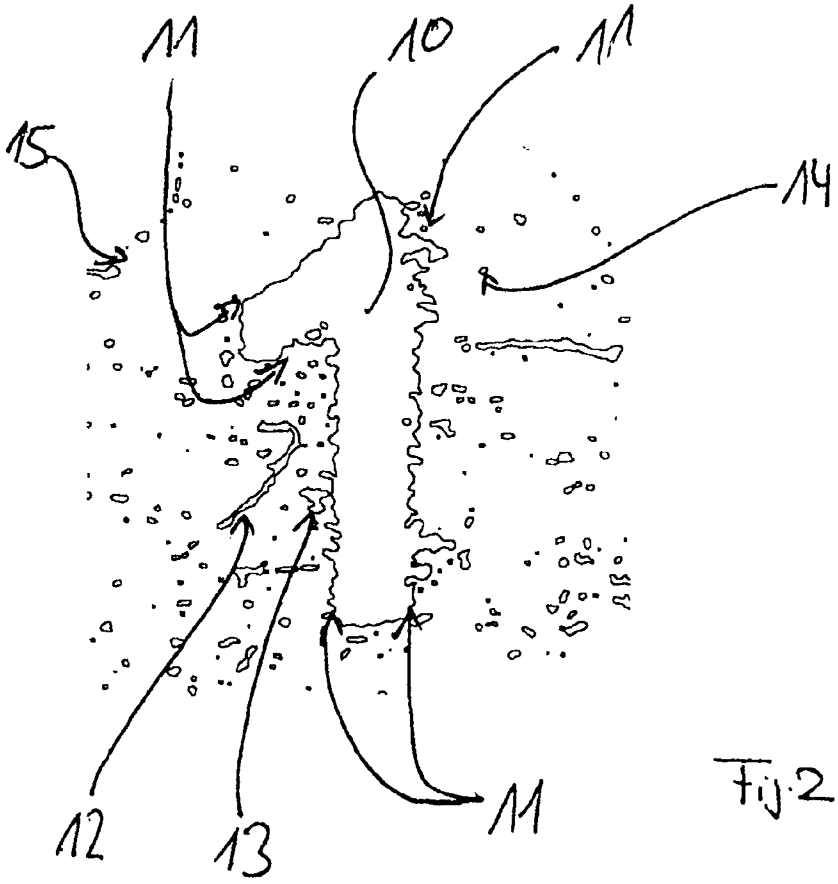
FIG. 2 is a second schematic representation to illustrate the inventive method for printing a printing substrate.

FIG. 1 shows a section of a printed printing substrate in the area of a dynamic printed image 10, wherein according to FIG. 1, a "1" is printed on the printing substrate as a dynamic printed image 10. FIG. 2 shows a digitized measured image of the printing substrate region from FIG. 1 that was produced with the aid of a camera.

FIGS. 1 and 2 directly show that the to-be-measured section of the printing substrate has characteristic properties in the area of the dynamic printed image 10, which may be used to check authenticity. Thus, a contour 11 of the dynamic printed image 10, namely the dynamically printed "1," features an individual edge characteristic, which turns out to be different for every printed copy.

In addition, characteristic or random patterns or artifacts, which are also different for every printed copy, are produced in the surrounding area of the dynamic printed image 10, namely the printed "1."

Patterns or artifacts 12 in the surrounding area of the actual printed image are produced, for example, in that the printing substrate has a random condition in this section, which affects the dissemination of printing ink.

Moreover, patterns or artifacts 13 may be caused by the fact that so-called satellite drops reach the printing substrate randomly in the case of a printing ink drop that is actually to be applied.

In addition, patterns or artifacts 14 may be caused by the fact that printing ink drops that hit the printing substrate with high kinetic energy disperse upon impact and get distributed randomly on the printing substrate in the surrounding area of the actual printed image.

Furthermore, characteristic paper fibers of the printing substrate are detected as a pattern 15 in the surrounding area of the actual dynamic printed image and may be used to verify the authenticity of a printed copy.

The above-mentioned random patterns or artifacts are different in the case of every printed copy and may be determined by means of image processing methods known from practice, such as, for example, digital filters, binaryzations or edge analysis algorithms.

If a printed copy that has been printed and recorded once is subsequently manipulated, then its authenticity may be verified via the comparison with the database. To verify the authenticity of a concrete printed copy, the printed copy is detected using measuring techniques and the measured values detected in this process are compared with the measured values that were detected using measuring techniques and recorded in a database after the static and dynamic printing of the printed copy. Consequently, there is a bi-unique relation between a dynamic printed image and a printed copy. In addition, it is possible to check whether, for example, all lottery numbers were printed in the case of a lottery and therefore assigned.

The present invention relates to a method for printing a printing substrate, wherein the printing substrate is printed with a printing-plate-based printing method, as well as, additionally, preferably in-line with the printing-plate-based printing method with a non-printing-plate-based printing method. The printing-plate-based printing method is preferably an offset printing method and the non-printing-plate-based printing method is preferably an inkjet printing method. The inventive method is used in web-fed rotary printing presses in particular.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for printing a printing substrate, comprising printing the printing substrate by a printing-plate-based printing method with a printed image that is a static image for all printed copies of the printing substrate, and printing the printing substrate by a non-printing-plate-based printing method with a printed image that is a dynamic image, and thus, is variable for all printed copies of the printing substrate, wherein after the static and dynamic images are printed on the printed copies of the printing substrate, each printed copy is detected using a measuring technique and recorded at least in sections in such a manner that each printed copy is verifiable with respect to an authenticity of the printed copy.

2. The method according to claim 1, wherein the printing-plate-based printing method is an offset printing method and wherein the non-printing-plate-based printing method is an inkjet printing method.

3. The method according to claim 1, wherein after the static and dynamic images are printed on the printed copy, at least the dynamic image on the printed copy is detected using the measuring technique and is recorded at least in sections.

4. The method according to claim 1, wherein in a vicinity of the dynamic image, patterns and/or artifacts generated when printing the dynamic image are detected, and/or in the vicinity of the dynamic image, patterns and/or artifacts generated when printing the static image are detected, and/or in the vicinity of the dynamic printed image, properties of the printing substrate are detected, on a basis of which the authenticity of the printed copy is detected using the measuring technique and is recorded.

5. The method according to claim 1, wherein a sensor, which stores a digitized measured image in a database, is used to detect at least the dynamic image.

6. The method according to claim 5, wherein a camera is used as the sensor whose resolution and/or exposure time is adapted to a printing speed.

7. The method according to claim 1, wherein the printed copy is recorded using the measuring technique in-line with the printing of the dynamic image.

8. The method according to claim 1, wherein the printed copy is recorded using the measuring technique offline with the printing of the dynamic image.

9. The method according to claim 1, wherein the printing of the dynamic image takes place in-line with, or offline from, the printing of the static image.

10. The method according to claim 1, wherein to verify the authenticity of the printed copy, the printed copy is detected using the measuring technique and measured values detected by the measuring technique are compared to measured values detected and recorded in a database after the printing of the static and dynamic images.

* * * * *